Figure 19:
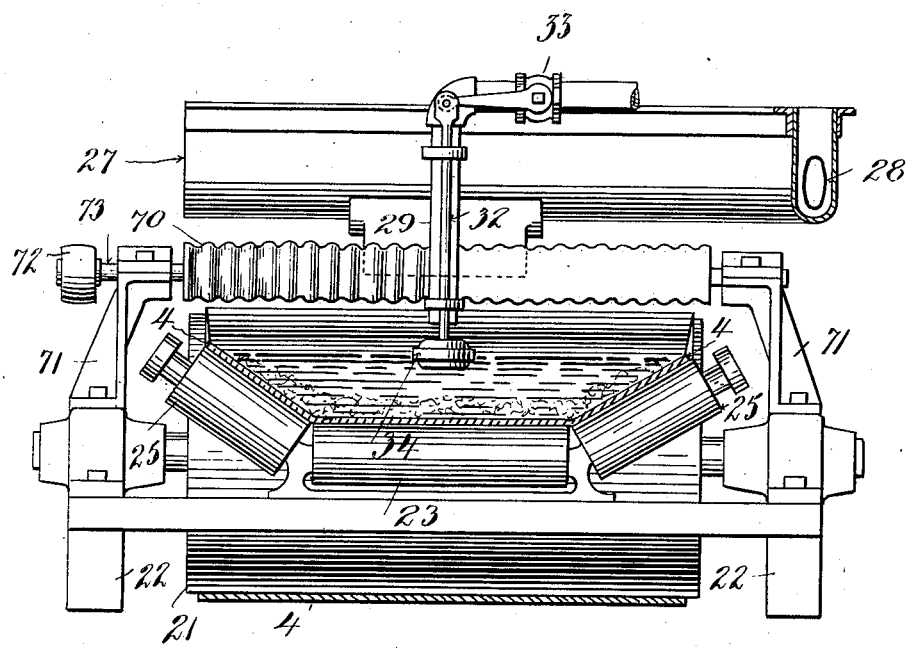

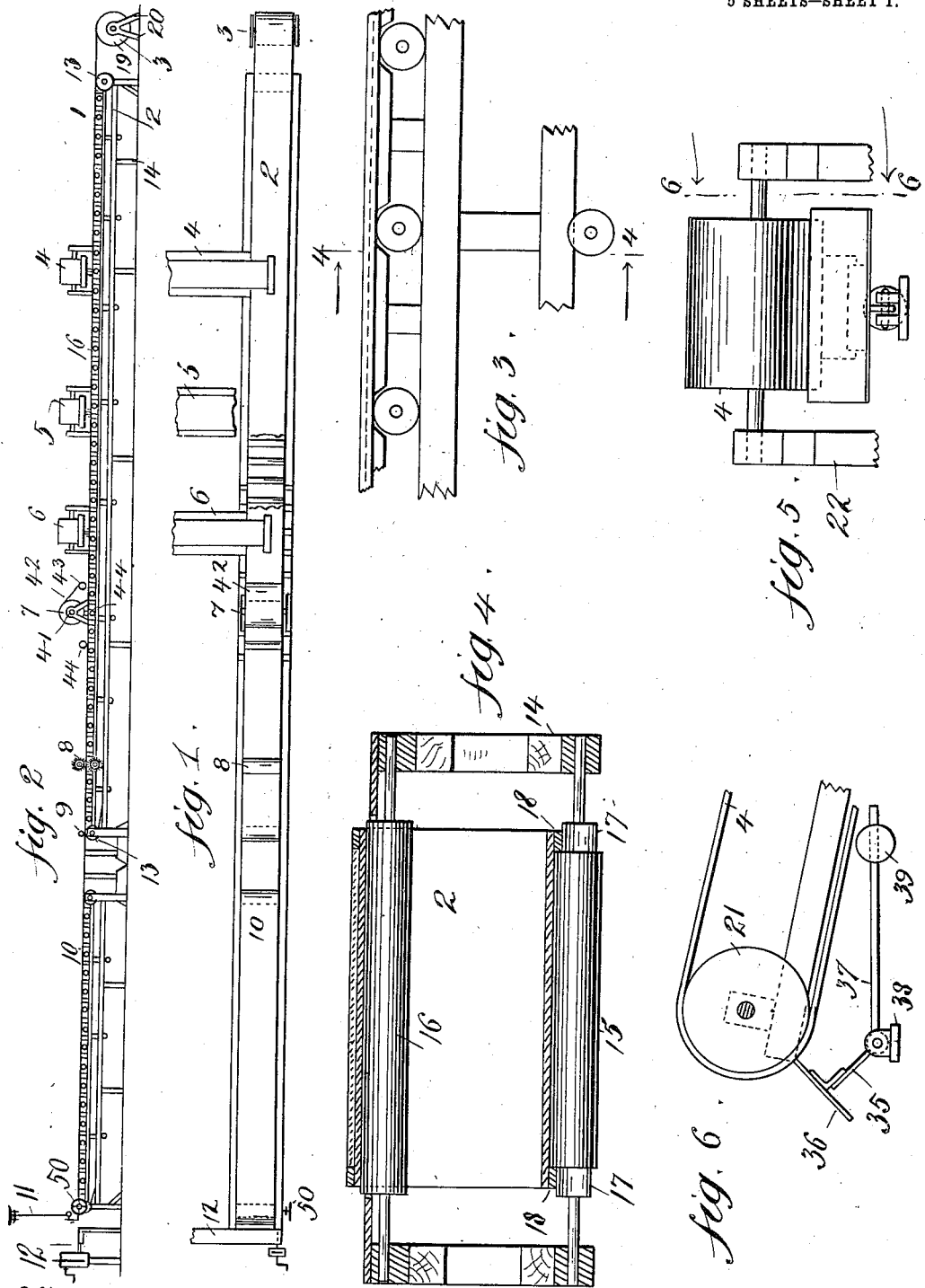

G. R. KING.
PROCESS OF MAKING PLASTER BOARD.
APPLICATION FILED JUNE 8, 1909. RENEWED JUNE 25, 1912.
1,036,124.
Patented Aug. 20, 1912.
5 SHEETS—SHEET 2.
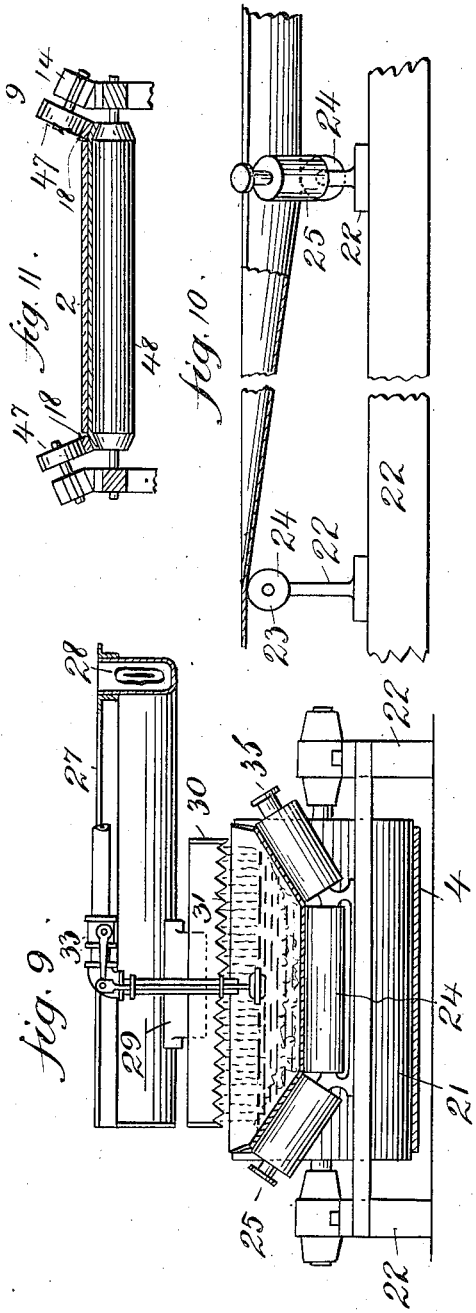
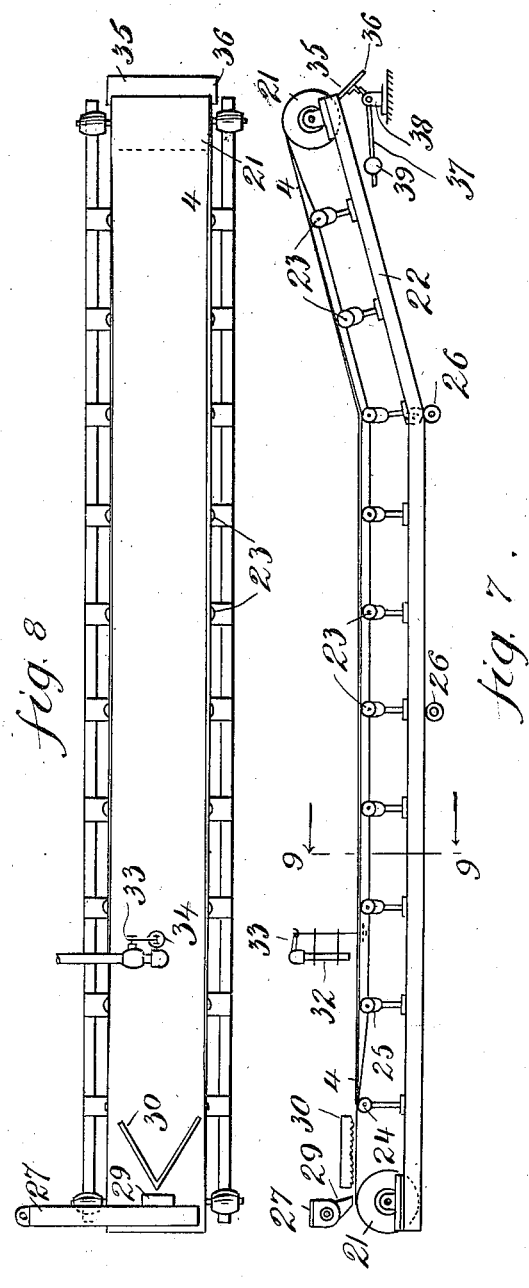

G. R. KING.
PROCESS OF MAKING PLASTER BOARD.
APPLICATION FILED JUNE 8, 1909. RENEWED JUNE 25, 1912.
1,036,124.
Patented Aug. 20, 1912.
5 SHEETS—SHEET 3.
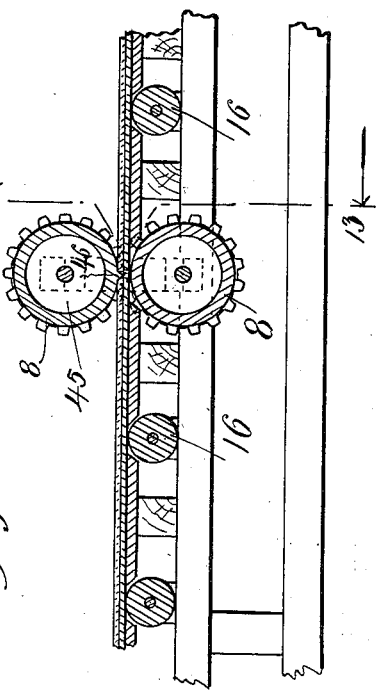
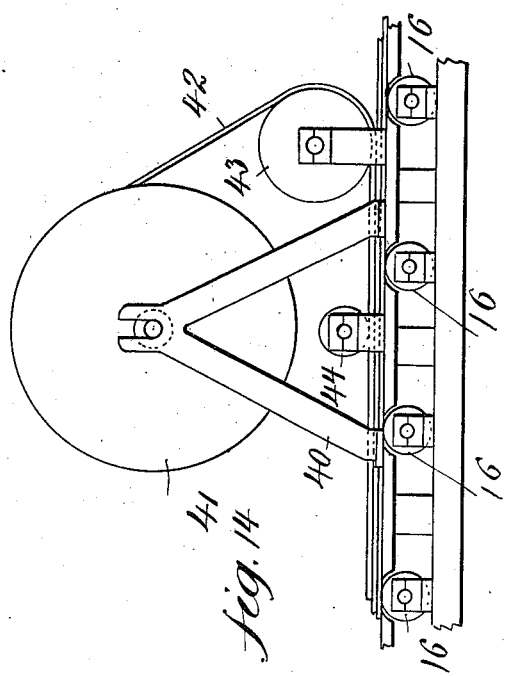
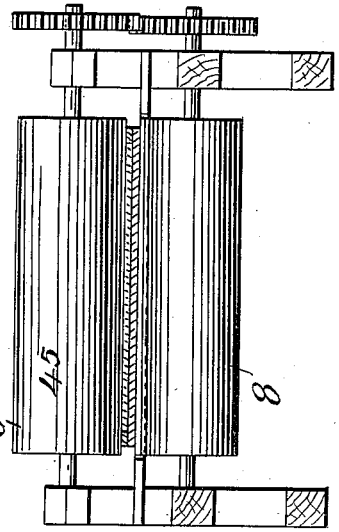
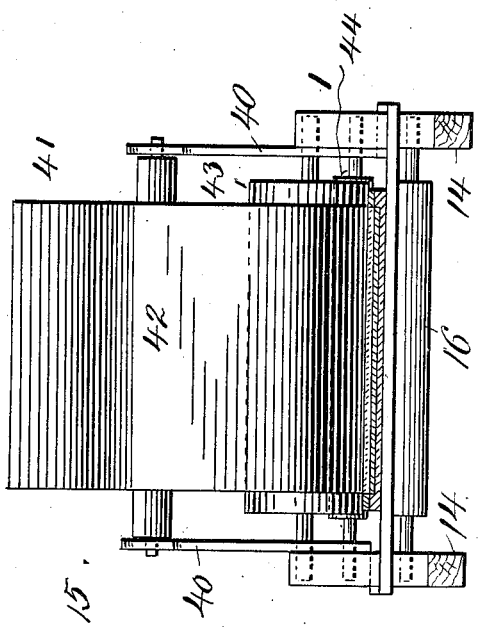
Witnesses:
Inventor
George R. King.
By his Attorney

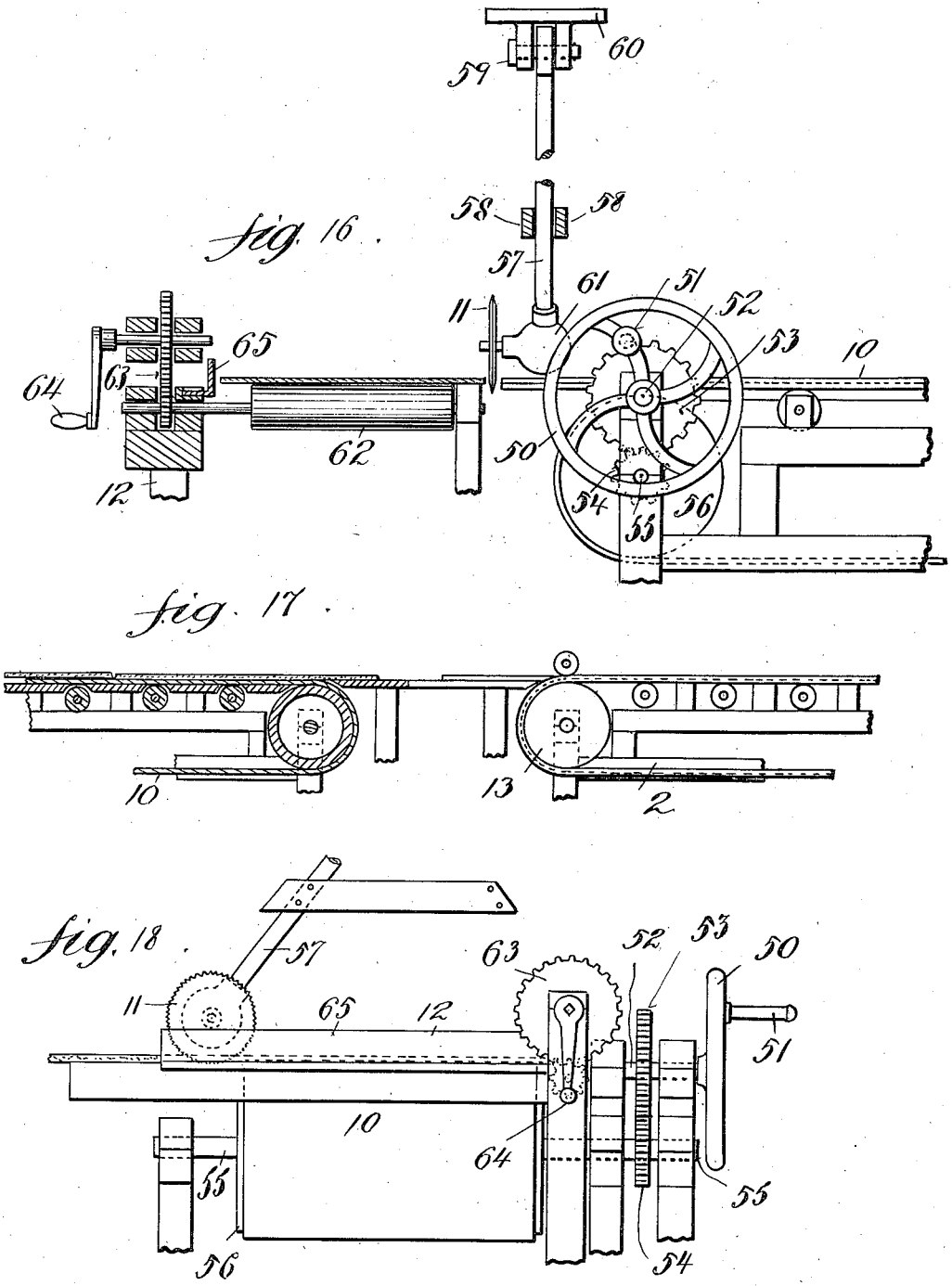

UNITED STATES PATENT OFFICE.

GEORGE R. KING, OF NEW YORK, N. Y., ASSIGNOR TO J. B. KING & CO., A CORPORATION OF NEW YORK.

PROCESS OF MAKING PLASTER-BOARD.

1,036,124.　　　　Specification of Letters Patent.　　Patented Aug. 20, 1912.

Application filed June 8, 1909, Serial No. 500,911. Renewed June 25, 1912. Serial No. 705,864.

*To all whom it may concern:*

Be it known that I, GEORGE R. KING, a citizen of the United States, and resident of the city of New York, county of Richmond, and State of New York, have made a new and useful Improvement in the Process of Making Plaster-Board, of which the following is a specification.

The object of my invention is to automatically form a plaster board in continuous sheets which may be readily severed into the desired lengths and then removed from the machine. This object is accomplished by my present invention, an embodiment of one form of apparatus for carrying out which is herein illustrated.

For a more particular description of my invention, reference is to be had to the accompanying drawings forming a part hereof, in which, Figure 1 is a plan view of my improved machine. Fig. 2 is a side elevation of the same. Fig. 3 is an enlarged side elevation of a portion of the same. Fig. 4 is a sectional view taken on the line 4—4 of Fig. 3, looking in the direction of the arrows. Fig. 5 is an enlarged end elevation of the plaster making part of the apparatus, and shows a scraper for cleaning a belt thereof. Fig. 6 is a sectional view taken on the line 6—6 of Fig. 5, looking in the direction of the arrows. Fig. 7 is a side elevation of the plaster making portion of the apparatus. Fig. 8 is a plan view of the structure shown in Fig. 7. Fig. 9 is an enlarged sectional view taken on the line 9—9 of Fig. 7, looking in the direction of the arrows. Fig. 10 is an enlarged elevation of a portion of the structure shown in Fig. 7, portions being shown in section. Fig. 11 is a sectional view of the machine for making the plaster board, and shows mechanism for the edges so as to free the board from the machine except that it rests thereon. Fig. 12 is a longitudinal section of a portion of the plaster board machine. Fig. 13 is a sectional view taken on the line 13—13 of Fig. 12, looking in the direction of the arrows. Figs. 14 and 15 are side and end views respectively, of a paper roll and the parts connected therewith. Figs. 16, 17 and 18 are detailed views showing the mechanism for severing the straw board into slabs of definite length, Fig. 17 showing the structure on the right of Fig. 16. Fig. 19 shows a modified mixer for the plaster and water.

Throughout the various views of the drawings, similar reference characters designate similar parts.

The apparatus herein disclosed as showing one form of means for carrying out my method consists essentially of an endless carrier 2, which is provided with a paper supplying means such as a roll 3, a plaster supplying means such as an endless belt 4, a fiber supplying means 5 which may be of any suitable form, a second plaster supplying means 6, which is also preferably an endless belt conveyer identical with the part 4, a second paper supplying means 7, which is preferably substantially the same as the means 3, compressing means 8 and 9, a second carrier 10, a severing device 11, of any suitable form, not necessarily a swing saw as shown, and a table with a carrier 12 for removing the plaster board.

The endless carrier 2 and the parts connected therewith embody the principal part of my invention. The carrier is provided at each end with a roller 13 mounted in suitable frame work 14, on which are also mounted the lower rollers 15 and the upper rollers 16, the upper rollers carrying the weight of the conveyer and its load and the lower rollers 15 serving merely to sustain the weight of the conveyer while inoperative on its return run.

The rollers 15 (Fig. 4) are reduced in diameter at their ends 17 so as to receive the thickened edges 18 of the conveyer 2. These edges 18 are made of the same thickness as the plaster board and run parallel, and separated from each other the width of the board. The conveyer is made sufficiently long to permit the devices above mentioned to be placed in proper relation thereto. It may be longer if desired and may be run at any desired speed, providing that the plaster does not set until after the board is passed from under the rollers 8.

The paper supplying means 3 consists of an ordinary paper roll 19 mounted in the conventional manner and suitable standards 20 adjacent to the end of the conveyer 2, as shown in Figs. 1 and 2, so that the paper from the roll 19 is placed upon the belt 2 as soon as it takes its upper run.

The plaster is applied in a proper condition and placed on the paper from the roll 19 by the conveyer 4, which will now be described, together with the parts in combination therewith. The conveyer 4 is mounted on suitable rollers 21 carried by any suitable supports 22 in the conventional manner, and on its upper run the conveyer 4 is supported by suitable rollers 23 mounted as shown in Figs. 7, 8, 9 and 10. That is, some rollers 24 are mounted each on a horizontal axis, and others 25 are mounted each on an inclined axis so as to elevate the edges of the belt and make a suitable water-holding receptacle of the same throughout a portion of its upper run. As shown in Figs. 7 and 10 the last two rollers 23 are elevated and the first roller 25 has its lower edges depressed below the roller 24 at the extreme left of these figures. This construction makes the belt form what might be called a trough during a portion of its upper run. The lower and rearward run of the belt 4 is over the lower rollers 26 which are mounted in any suitable manner in the frame 22.

Immediately above the rear roller 21 and supported by any suitable means, not shown, is a trough 27, provided with a suitable spiral conveyer 28 in the trough 27 in the conventional manner and over the medial line of the belt 4 is a spout 29 running from the trough 27 so that the plaster powder such as plaster of Paris may be conveyed in the trough 27 by the conveyer 28 and deposited through the spout 29 on to the belt 4 in any desired quantities. Immediately in front of the spout 29 is a rack 30 mounted by any suitable means, not shown, and provided with a serrated lower edge 31 which has the function of distributing the plaster evenly over the belt 4. The belt under the rack 30 is practically horizontal and a little beyond this on its forward run it is made trough shaped, as shown. Near the beginning of its trough shaped portion and over the same is a pipe 32 connected with any suitable source of water supply. This pipe 32 is preferably vertically disposed in its upper portion and it is also provided with a float valve 33 which will govern the water flowing on to the belt 4 when the apparatus is in use. The float 33 then rises on the water in the trough-like portion of the belt 4. This trough-like portion is made sufficiently long to hydrate the plaster of Paris, and passes from this in a thoroughly hydrated condition over the forward roller 21 and clings to the belt over this roller until it strikes a scraper 35 which consists of a horizontal plate 36 mounted on a bell crank lever 37 fulcrumed at 38 in any suitable manner and provided with a weight 39 which is fixed to one arm of the lever 37, the plate 36 being fixed to the other. The plaster in its hydrated condition while it is still soft slides from the plate 36 to the paper from the roll 19 on the conveyer 2, and is liquid enough to settle on this paper between the guides 18 at each side of the conveyer 2. This plaster then passes on the paper as above described, to the means 5 for supplying fiber, which fiber is distributed over the plaster evenly and with the required thickness. This means 5 may be a table or anything else by means of which the fiber may be fed by hand or machinery and over the plaster. The belt 2 with its contents then passes under the second plaster carrying belt numbered 6 which with its coöperating parts is identical with the belt 4 and its coöperating parts so that a further description is unnecessary. Under this belt 6 the fiber receives a second coat of plaster in a hydrated condition, which plaster spreads itself evenly over the fiber. From the second plaster distributing means 6 the belt moves on with its contents under the paper from the paper-supplying means 7. The paper-supplying means consists of a standard 40 similar to the standard 20 and a paper roll 41 identical with the paper roll 19 and the paper 42 from this roll passes under the roll 43 which is parallel with the conveying rollers 16, and this roller 43 distributes the paper evenly and correctly over the top layer of plaster deposited by the hydrator 6. Other rollers 44, parallel to the rollers 16 and 43 further press the paper 42 and the rest of the plaster board beneath the same into a close and compact union and the plaster then becomes set and then passes forward with the belt 2 to the compressing and marking rollers 8 and give the board its final shape and finish. The paper roller 45 is provided with a projection 46 which cuts the board into slabs of a predetermined length, or merely marks the board as desired. This marking is for the purpose of convenience in handling and is not necessarily the final severing as will appear below.

The slabs of plaster board are separated from the edges 18 in the following manner:—The rollers 9 are beveled rollers. The beveled rollers 47 are set at an angle as shown in Fig. 11, and the lower roller 48 has conical ends so that the edges of the belt 2 are bent down as shown, by the rollers 47. All these rollers are mounted in the conventional way so that a detailed description of their mountings is unnecessary. If desired, the roller 48 may be omitted and the ends of the lower roller 13 beveled and the rollers 47 placed immediately above the same as shown in Fig. 2. This is the preferred construction as it prevents the edges 18 from coming in contact with the plaster board.

As intimated above, the conveyer 2 should be long enough to permit the plaster to set sufficiently and permit the board to pass from the conveyer 2 to the conveyer 10. If this is the case the belt may be run continuously. Otherwise it must be run intermittently to give the plaster sufficient time to set.

The table 10 is a plain conveyer mounted as the conveyer 2 and the same in all respects except that it is preferably shorter and the thickened edges 18 are omitted. The forward run of this conveyer 10 is manually controlled and at a higher speed than the conveyer 2 so that the slabs which have been severed are drawn forward rapidly by turning the wheel 50 which is provided with a handle 51 for this purpose. This wheel 50 is fixed to a shaft 52 to which is fixed a gear 53 meshing with a pinion 54 which is fixed to a shaft 55 to which is also fixed a frame 56 which carries the conveyer 10 on its periphery. When each slab is fed to its proper position it is severed by the saw 11 mounted on a suitable arm 57 guided by parallel guides 58 and pivoted at its upper end by a pin 59 held in a bracket 60 in any suitable manner. The saw 11 may be driven by any suitable means, as an electric motor 61, and is given a sufficient diameter to permit the saw to cut clean through the slab from edge to edge without having the motor 61 come in contact with its upper surface. If desired the arm 57 may be made telescopic for this purpose. The table 12 is provided with suitable rollers 62 driven by gears 63 which in turn are driven by a crank 64 or other suitable means in the same manner as the gears 53 and 54, above described. The table 12 is also provided with a suitable stop 65 which is set in accordance with the length of the slab to be severed, the distance from the stop 65 to the saw 11 being the length of the slab. From the hand driven rollers 62 the severed slab passes to the power driven rollers or other suitable conveyers which carry it as desired.

In view of the foregoing the operation of my improved plaster board will be readily understood. Assuming that the parts of the machine are as shown in Figs. 1 and 2, paper from the roller 19 is first run under the plaster supplying conveyer 4 which conveys the plaster on said paper as above described. The paper and plaster then pass by the table 5, where fiber is placed on the plaster and then the paper with its supply of plaster and fiber is then fed to the second plaster-supplying means 6 where a second supply of plaster is had, as above described, then the paper with its load passes to a second paper supplying device 7 and thence under the marking and pressing rolls 8 and 44 to the rolls 9 and from thence to the table 10 where the slabs are severed with the aid of the saw 11 and passes away from the apparatus from the table 12 as above described.

The structure shown in Fig. 19 is a modified mechanism which is the same as the mixer shown in Fig. 9, except that the scraper 30 is dispensed with and a corrugated roller 70 substituted in lieu thereof. This roller is mounted in suitable bearings 71 on the frame 22 and is reached by means of a pulley 72 on the shaft 73 of the roller 70. This pulley 72 may be driven by any suitable means, not shown. The rotation of this corrugated roller 70 will distribute the plaster evenly over the belt 4.

It is obvious that my invention in the present instance is in no wise restricted to the carrying out of the same by the exact form of apparatus above described but is broad enough to cover all methods that come within the scope of the annexed claims.

What I claim is:—

1. In the manufacture of plaster board the steps which consist in maintaining a flexible belt conveyer in constant motion with a part of its upper run in a trough-like shape, supplying thereto uniformly plaster and water, and controlling the supply of the water by its depth on the conveyer thereby keeping the supply uniformly constant.

2. The herein described method of forming plaster board which consists in maintaining a flexible belt conveyer in constant motion with a part of its upper run in a trough-like shape, supplying thereto uniformly plaster and water, controlling the supply of the water by its depth on the conveyer thereby keeping the supply uniformly constant, and supplying paper to a second conveyer, depositing the hydrated plaster on the paper on the said second conveyer and then feeding said plaster and paper forward.

3. The herein described method of forming plaster board which consists in maintaining a flexible belt conveyer in constant motion with a part of its upper run in a trough-like shape, supplying thereto uniformly plaster and water, controlling the supply of the water by its depth on the conveyer thereby keeping the supply uniformly constant, supplying paper to a second conveyer, depositing the hydrated plaster on the paper on the said second conveyer, feeding said plaster and paper forward and then supplying fiber upon said hydrated plaster.

4. The herein described method of forming plaster board which consists in maintaining a flexible belt conveyer in constant motion with a part of its upper run in a trough-like shape, supplying thereto uniformly plaster and water, controlling the supply of the water by its depth on the conveyer thereby keeping the supply uniformly constant, supplying paper to a second conveyer, depositing the hydrated plaster on the paper on the said second conveyer, feeding said plaster and paper forward, then supplying fiber upon said hydrated plaster, distributing the fiber evenly over said plaster, and then supplying a second coat of hydrated plaster upon the fiber.

5. The herein described method of forming plaster board which consists in maintaining a flexible belt conveyer in constant motion with a part of its upper run in a trough-like shape, supplying thereto uniformly plaster and water, controlling the supply of the water by its depth on the conveyer thereby keeping the supply uniformly constant, supplying paper to a second conveyer, depositing the hydrated plaster on the paper on the said second conveyer, feeding said plaster and paper forward, then supplying fiber upon said hydrated plaster, distributing the fiber evenly over said plaster, then supplying a second coat of hydrated plaster upon the fiber and permitting such plaster to flow and spread itself evenly over the fiber.

Signed at the city of New York, county of Richmond and State of New York, this 5th day of June, 1909.

GEO. R. KING.

Witnesses:
JOHN COSTELLO,
THOMAS MCCORMACK.